US012323565B2

(12) United States Patent
Fujii

(10) Patent No.: US 12,323,565 B2
(45) Date of Patent: Jun. 3, 2025

(54) INFORMATION PROCESSING APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Manabu Fujii, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 209 days.

(21) Appl. No.: 18/150,582

(22) Filed: Jan. 5, 2023

(65) Prior Publication Data

US 2023/0224422 A1 Jul. 13, 2023

(30) Foreign Application Priority Data

Jan. 7, 2022 (JP) .................................. 2022-001442

(51) Int. Cl.
*H04L 9/32* (2006.01)
*H04N 1/44* (2006.01)

(52) U.S. Cl.
CPC ......... *H04N 1/4413* (2013.01); *H04L 9/3213* (2013.01)

(58) Field of Classification Search
CPC ........................... H04N 1/4413; H04L 9/3213
See application file for complete search history.

(56) References Cited

U.S. PATENT DOCUMENTS

| | | | | |
|---|---|---|---|---|
| 2006/0075474 A1* | 4/2006 | Takeuchi | ................ | G06F 21/41 726/5 |
| 2011/0075204 A1* | 3/2011 | Yoshimura | ............ | G06F 3/1288 358/1.15 |
| 2012/0314250 A1* | 12/2012 | Ito | ...................... | H04N 1/00204 358/1.15 |
| 2014/0298422 A1* | 10/2014 | Odajima | ............... | H04L 9/0833 726/4 |
| 2021/0336950 A1* | 10/2021 | Miyamoto | ........... | H04N 1/4413 |
| 2022/0066707 A1* | 3/2022 | Shiohara | ............... | G06F 3/1238 |
| 2023/0224422 A1* | 7/2023 | Fujii | .................... | H04N 1/4413 726/20 |

FOREIGN PATENT DOCUMENTS

JP 2016207226 A 12/2016

* cited by examiner

*Primary Examiner* — Ponnoreay Pich
(74) *Attorney, Agent, or Firm* — Canon U.S.A., Inc. IP Division

(57) ABSTRACT

An information processing apparatus according to an exemplary embodiment of the present disclosure provides a service. In a case where the information processing apparatus receives a registration request for registering an image forming apparatus in the service, the information processing apparatus issues an access token based on an output authority of an instructing user who has given an instruction to transmit the registration request, and transmits the issued access token to the image forming apparatus.

11 Claims, 13 Drawing Sheets

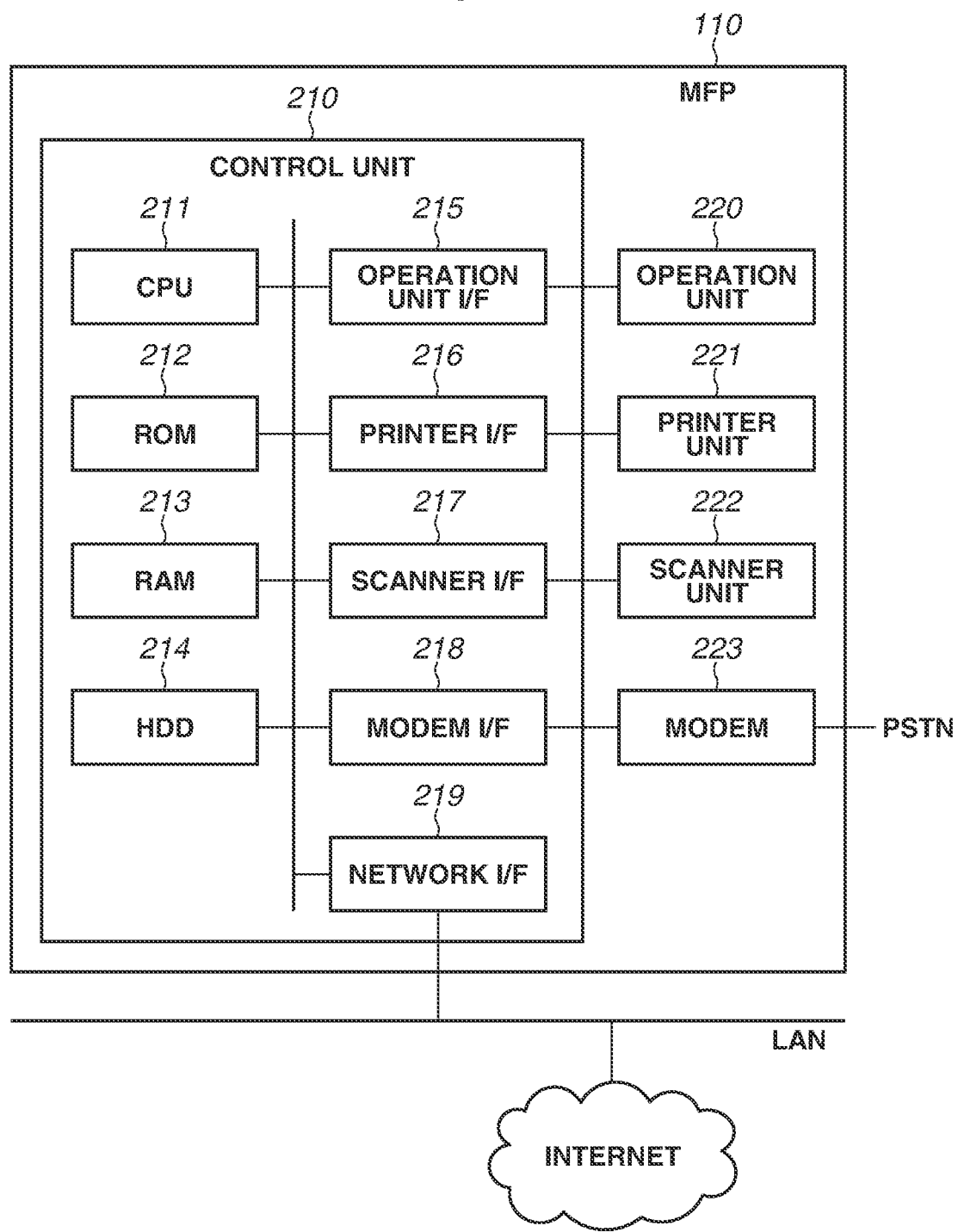

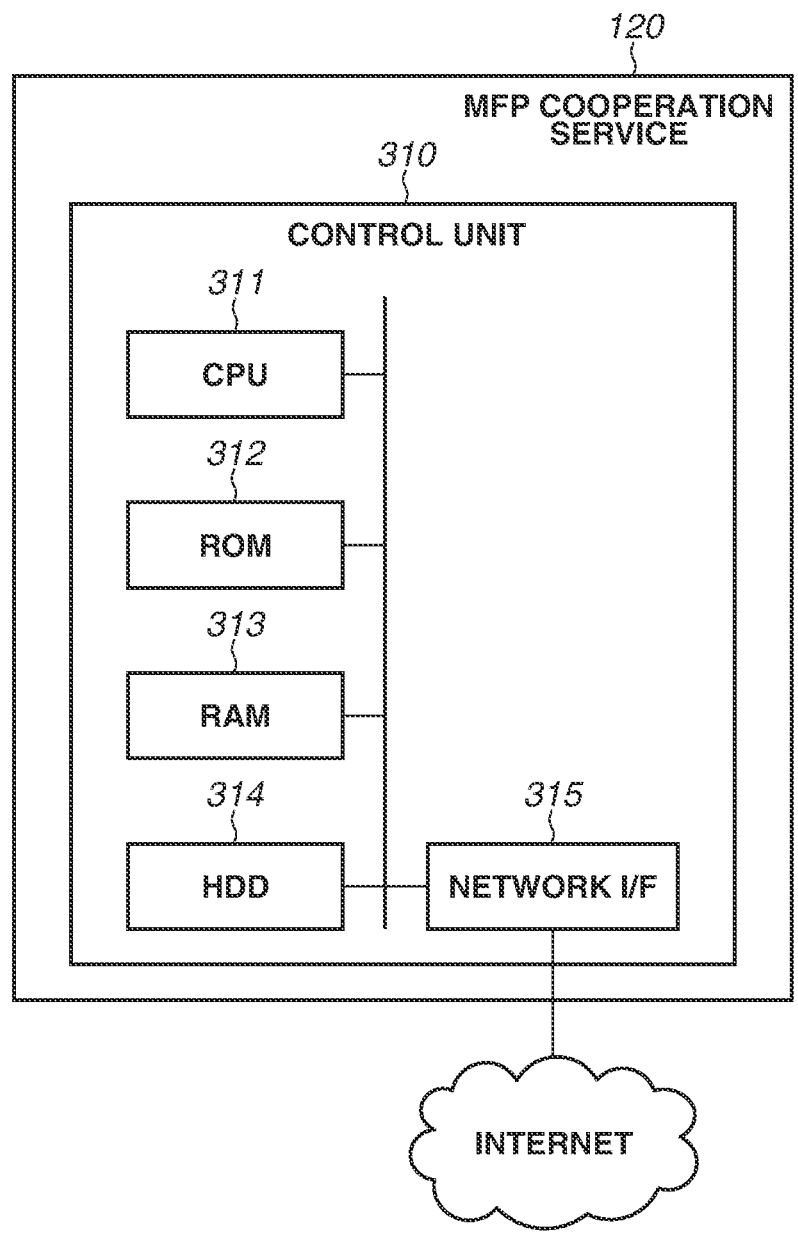

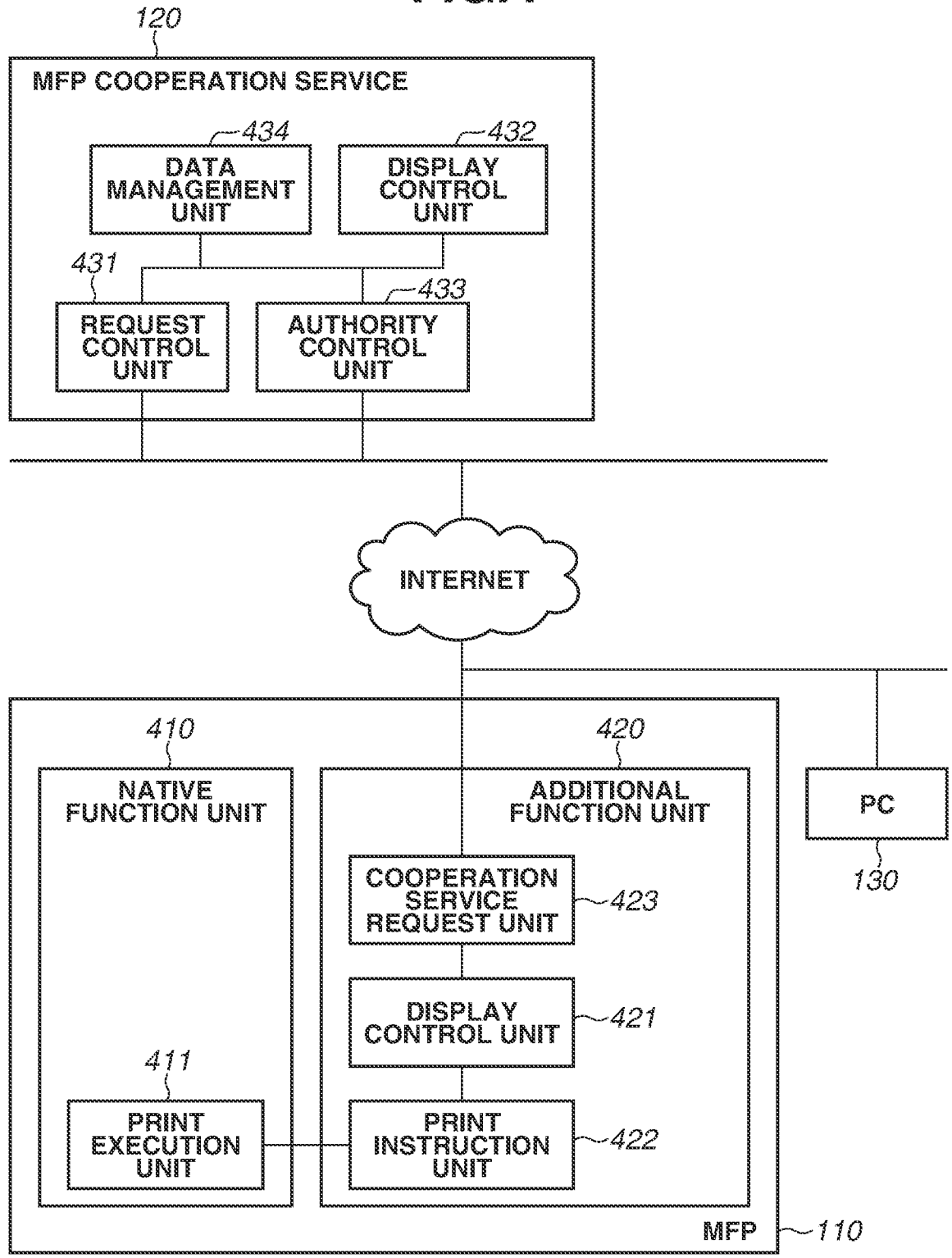

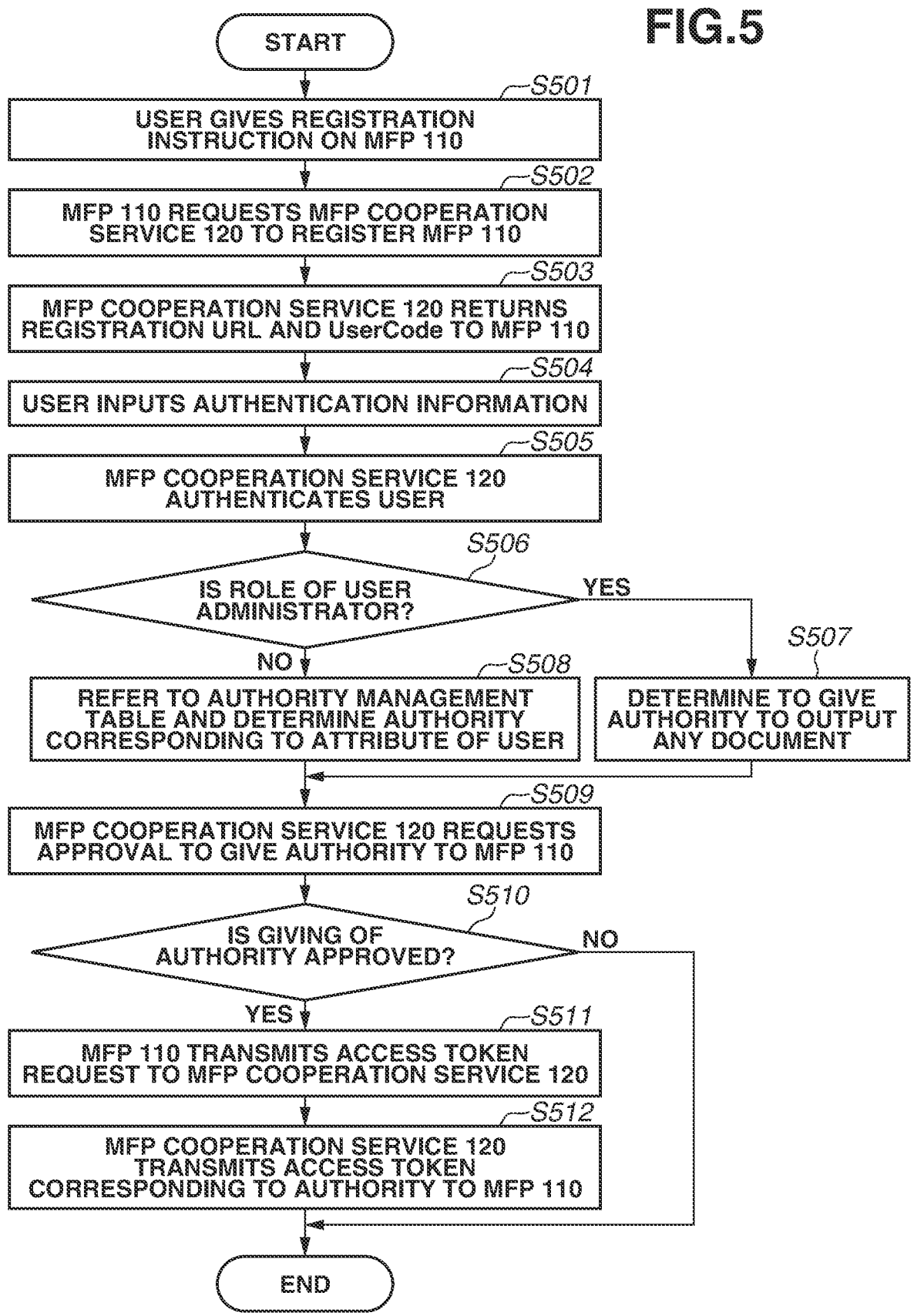

FIG.6

| USER ATTRIBUTE | AUTHORITY OF MFP | VALIDITY PERIOD |
|---|---|---|
| ROLE = MANAGER | CAPABLE OF OUTPUTTING DOCUMENTS WITH MEDIUM CONFIDENTIALITY LEVEL | ONE MONTH |
| ROLE = USER | CAPABLE OF OUTPUTTING DOCUMENTS WITH LOW CONFIDENTIALITY LEVEL | ONE WEEK |
| DEPARTMENT = LEGAL | CAPABLE OF OUTPUTTING DOCUMENTS IN PATH://ROOT/LEGAL/**/*.* | ONE MONTH |

601 — USER ATTRIBUTE
602 — AUTHORITY OF MFP
603 — VALIDITY PERIOD
600 AUTHORITY MANAGEMENT TABLE

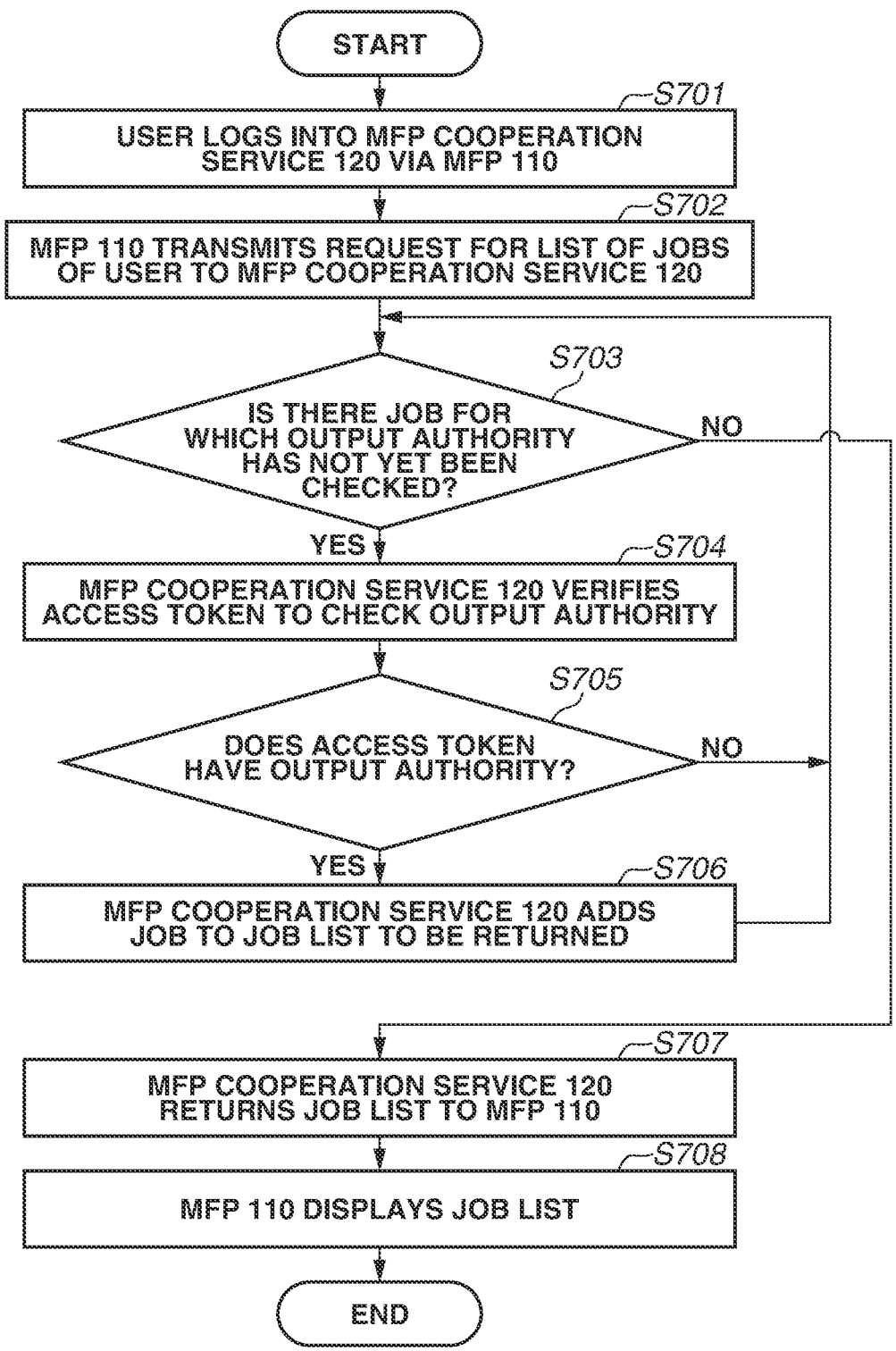

USER NAME

TEST USER

PASSWORD

********

LOGIN

*902*

DO YOU AGREE TO GIVE FOLLOWING OUTPUT AUTHORITIES TO MFP?

· OUTPUT DOCUMENTS WITH LOW CONFIDENTIALITY LEVEL
· OUTPUT DOCUMENTS IN PATH://ROOT/LEGAL/**/*.*

REJECT    APPROVE

FIG.10

| USER ID | ROLE | DEPARTMENT | USER NAME |
|---|---|---|---|
| abc | ADMINISTRATOR | IT | TEST USER |
| xyz | MANAGER | DEVELOPMENT | XYZ |
| pqrs | USER | LEGAL | PQRS |

1000 USER TABLE

```
POST /device_authorization HTTP/1.1
Host: server.example.com
Content-Type: application/x-www-form-urlencoded client_id=1406020730&scope=example_scope
```

FIG.12

| ACCESS TOKEN | AUTHORITY | EXPIRATION DATE | CLIENT_ID |
|---|---|---|---|
| abc123 | CAPABLE OF OUTPUTTING DOCUMENTS WITH MEDIUM CONFIDENTIALITY LEVEL | 2021-11-30T10:10:10 | xxx |
| xyz098 | CAPABLE OF OUTPUTTING DOCUMENTS WITH LOW CONFIDENTIALITY LEVEL | 2021-12-01T09:08:34 | yyy |
| pqrs3456 | CAPABLE OF OUTPUTTING DOCUMENTS WITH LOW CONFIDENTIALITY LEVEL | 2021-12-03T14:22:22 | zzz |

*1200 ACCESS TOKEN TABLE*

FIG.13

| JOB NAME | | BLACK AND WHITE | TWO-SIDED/ ONE-SIDED |
|---|---|---|---|
| Doc123.docx | REQUEST APPROVAL | BLACK AND WHITE | TWO-SIDED |
| Pdf123.pdf | | COLOR | TWO-SIDED |
| Xyz.txt | REQUEST APPROVAL | BLACK AND WHITE | ONE-SIDED |

1301

1300 JOB LIST

INFORMATION PROCESSING APPARATUS, CONTROL METHOD, AND NON-TRANSITORY COMPUTER-READABLE STORAGE MEDIUM

BACKGROUND

Field

The present disclosure relates to an information processing apparatus that gives an access token to an image forming apparatus at the time of registering the image forming apparatus, a control method for the information processing apparatus, and a non-transitory computer-readable storage medium.

Description of the Related Art

With the prevalence of telework, there are increased opportunities for employees to print company documents using printers at home. Unlike printing in an office, printing at home poses a risk of information leakage due to the family or a visitor seeing a print product. Thus, there is a demand for limiting documents that can be output from the printers at home. To meet such a demand, Japanese Patent Application Laid-Open No. 2016-207226 discusses a method for limiting the output from an image forming apparatus belonging to a particular network based on the Internet Protocol (IP) address of the image forming apparatus.

However, the method discussed in Japanese Patent Application Laid-Open No. 2016-207226 is based on the IP address and does not deal with a case where the IP address is falsified or changed. It is undesirable to manage, based on such vague information, the authority to output documents in terms of security.

In a case where the output authority is managed by identifying an image forming apparatus based on the IP address, an administrator is to set, for each image forming apparatus, the authority to print documents. If the number of image forming apparatuses used increases, the management cost increases. Particularly in telework use cases, it is assumed that each user uses a printer at home. Thus, the number of printers used may be enormous, and thus it is not practical for the administrator to set the authority for each printer.

SUMMARY

According to an aspect of the present disclosure, an information processing apparatus configured to provide a service includes a memory and a processor. In a case where the information processing apparatus receives a registration request for registering an image forming apparatus in the service, the processor is configured to issue an access token based on an output authority of an instructing user who has given an instruction to transmit the registration request, and transmit the issued access token to the image forming apparatus.

Further features of the present disclosure will become apparent from the following description of exemplary embodiments with reference to the attached drawings.

BRIEF DESCRIPTION OF THE DRAWINGS

FIG. 2 is a diagram illustrating a hardware configuration of a multifunction peripheral (MFP).
FIG. 3 is a diagram illustrating a hardware configuration of an MFP cooperation service.
FIG. 4 is a diagram illustrating a software configuration of the entire system.
FIG. 5 is a flowchart illustrating processing performed in a case where the MFP is registered.
FIG. 6 is a diagram illustrating an authority management table.
FIG. 7 is a flowchart illustrating processing for verifying an output authority at the time of printing.
FIG. 9 is a schematic diagram illustrating a user authentication screen and an authority approval screen.
FIG. 10 is a diagram illustrating a user table.
FIG. 11 is a diagram illustrating a request to register the MFP.
FIG. 12 is a diagram illustrating an access token table.
FIG. 13 is a schematic diagram illustrating a job list displayed on the MFP.

DESCRIPTION OF THE EMBODIMENTS

In a first exemplary embodiment, a case will be described where an image forming apparatus (a multifunction peripheral (MFP) 110) is registered in an MFP cooperation service 120, the authority to output documents is given to the image forming apparatus based on an attribute of a user requesting the registration, and printing by the image forming apparatus 110 is limited.

Figure 1:
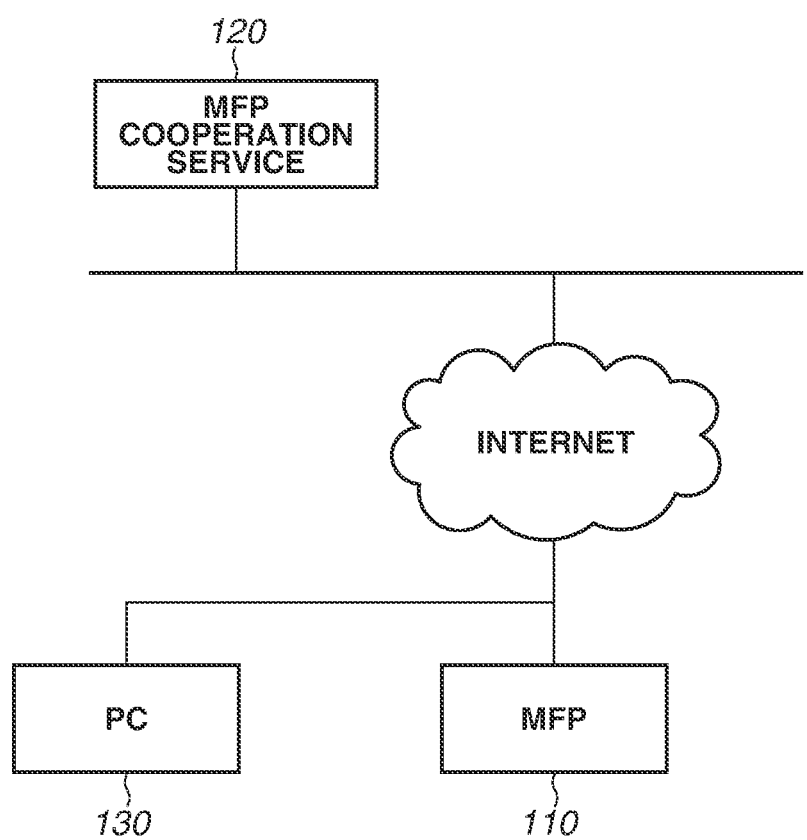
FIG. 1 is a diagram illustrating an entire system.

FIG. 1 illustrates an entire configuration of an image processing system according to the present exemplary embodiment. The image processing system includes the MFP 110, the MFP cooperation service 120, and a personal computer (PC) 130. The MFP 110 and the PC 130 are communicably connected to a server that provides various services on the Internet via a local area network (LAN).

The MFP 110 has a plurality of functions such as a scanner and a printer and is an example of an image processing apparatus. The MFP cooperation service 120 is an example of an information processing apparatus that cooperates with the MFP 110 to provide a print function such as a pull-print function. The PC 130 is an example of an information device such as a general personal computer and has a function capable of using the MFP cooperation service 120.

The image processing system according to the present exemplary embodiment includes the MFP 110, the MFP cooperation service 120, and the PC 130, but the configuration is not limited thereto. For example, the MFP 110 may double as the MFP cooperation service 120. The MFP cooperation service 120 may have a connection configuration in which the MFP cooperation service 120 is placed in a server not on the Internet but on the LAN. The PC 130 is connected to the LAN, but may be connected to the Internet.

FIG. 2 illustrates a hardware configuration of the MFP 110. The MFP 110 includes a control unit 210, an operation unit 220, a printer unit 221, a scanner unit 222, and a modem 223. The control unit 210 includes the following components 211 to 219 and controls the entire operation of the MFP 110. A central processing unit (CPU) 211 reads a control program stored in a read-only memory (ROM) 212 and executes and controls various functions of the MFP 110, such as a reading function, a print function, and a communication function. A random-access memory (RAM) 213 is used as a temporary storage area such as a main memory or a work area of the CPU 211. In the present exemplary embodiment, one CPU 211 executes each processing illustrated in flowcharts to be described below, using one memory (the RAM 213 or a hard disk drive (HDD) 214). The configuration, however, is not limited thereto. For example, a plurality of CPUs and a plurality of RAMs or HDDs may cooperate to execute the processing. The HDD 214 is a large-capacity storage unit that stores image data and various programs. An operation unit interface (I/F) 215 connects the operation unit 220 and the control unit 210. The operation unit 220 includes a touch panel and a keyboard and receives an operation, an input, or an instruction from a user.

A printer I/F 216 connects the printer unit 221 and the control unit 210. Image data to be printed is transferred from the control unit 210 to the printer unit 221 via the printer I/F 216, and printed on a recording medium by the printer unit 221. A scanner I/F 217 connects the scanner unit 222 and the control unit 210. The scanner unit 222 reads a document placed on a document platen or an auto document feeder (ADF) (not illustrated) to generate image data, and inputs the image data to the control unit 210 via the scanner I/F 217. The MFP 110 can cause the printer unit 221 to print out (copy) the image data generated by the scanner unit 222, and also transmit the image data as a file or an email. A modem I/F 218 connects the modem 223 and the control unit 210. The modem 223 performs facsimile communication of image data with a facsimile apparatus on the public switched telephone network (PSTN). A network I/F 219 connects the control unit 210 (the MFP 110) to the LAN. Using the network I/F 219, the MFP 110 transmits image data or information to each service on the Internet and receives various pieces of information from each service.

FIG. 3 illustrates a hardware configuration of the MFP cooperation service 120.

The MFP cooperation service 120 includes a control unit 310. The control unit 310 includes a CPU 311, a ROM 312, a RAM 313, an HDD 314, and a network I/F 315. The CPU 311 reads a control program stored in the ROM 312 and executes various types of processing, thereby controlling the entire operation of the MFP cooperation service 120.

The RAM 313 is used as a temporary storage area such as a main memory or a work area for the CPU 311. The HDD 314 is a large-capacity storage unit that stores image data and various programs. The network I/F 315 connects the MFP cooperation service 120 to the Internet. The MFP cooperation service 120 receives a processing request from another apparatus (e.g., the MFP 110) via the network I/F 315 and transmits and receives various pieces of information to and from another apparatus.

FIG. 4 illustrates a software configuration of the image processing system according to the present exemplary embodiment. The MFP 110 is divided into two main units, namely a native function unit 410 and an additional function unit 420. Units included in the native function unit 410 are provided as standard components in the MFP 110, whereas the additional function unit 420 is an application additionally installed on the MFP 110.

The additional function unit 420 is based on Java® and can easily achieve the addition of a function to the MFP 110. Another additional application (not illustrated) may also be installed on the MFP 110.

The native function unit 410 includes a print execution unit 411. The additional function unit 420 includes a display control unit 421, a print instruction unit 422, and a cooperation service request unit 423.

The display control unit 421 displays a user interface (UI) screen for receiving an operation from the user, on a liquid crystal display unit having a touch panel function of the operation unit 220 of the MFP 110. For example, the display control unit 421 displays UI screens such as a screen for inputting authentication information for accessing the MFP cooperation service 120, a screen for making print settings, a screen for performing a print start operation, and a preview screen. Along with print settings based on user instructions input through such UI screens, the print instruction unit 422 transmits a print request to the print execution unit 411.

The print execution unit 411 receives the print request including the print settings from the print instruction unit 422. The print execution unit 411 prints a document based on the print request.

The cooperation service request unit 423 requests the MFP cooperation service 120 to perform various types of processing. For example, the cooperation service request unit 423 transmits a login request or a request for a list of pull-print jobs. The cooperation service request unit 423 exchanges information with the MFP cooperation service 120 using a protocol such as Representational State Transfer (REST) or Simple Object Access Protocol (SOAP), but may use another communication method.

The MFP cooperation service 120 includes a request control unit 431, an authority control unit 433, a data management unit 434, and a display control unit 432.

The request control unit 431 stands by in a state where the request control unit 431 is ready to receive a request from an external apparatus. Upon receiving a processing request, the request control unit 431 instructs the authority control unit 433 or the data management unit 434 to perform processing as appropriate based on the request.

The authority control unit 433 manages the output authority of the image forming apparatus 110 managed by the MFP cooperation service 120. The authority control unit 433 manages an authority management table 600 (see FIG. 6) and also issues and manages an access token.

The data management unit 434 holds user information and various pieces of setting data managed by the MFP cooperation service 120.

The display control unit 432 receives a request from a web browser running on a different terminal (not illustrated), such as a PC or a mobile, connected to the MFP cooperation service 120 via the Internet, and returns screen configuration information (e.g., HyperText Markup Language (HTML) or Cascading Style Sheets (CSS)) for displaying a screen to the different terminal. The user views the user information registered in the MFP cooperation service 120 or edits the authority management table 600 through the screen displayed on the web browser.

FIG. 6 illustrates an example of the authority management table 600 managed by the authority control unit 433. In the present exemplary embodiment, an administrator user creates the authority management table 600 in advance and controls the output authority to be given to the image forming apparatus 110.

A column 601 indicates user attributes. In registration processing (described below) for registering the image forming apparatus 110, a user requesting the registration is identified, and the output authority to be given to the image forming apparatus 110 is determined based on the user attribute corresponding to the identified user in the column 601. For example, the output authority to be given to the image forming apparatus 110 can be changed based on information such as the role or department of the user. In the present exemplary embodiment, the configuration is described in which the authority is managed based on the role of the user or the department to which the user belongs. Alternatively, a configuration may be employed in which the authority is managed based on user identification information such as a user identifier (ID).

A column 602 indicates the output authority to be given to the image forming apparatus 110. The column 602 stores information regarding the authority that can be given to the MFP 110 by a user corresponding to each user attribute in the column 601. Once the authority has been given to the image forming apparatus 110, the image forming apparatus 110 can execute processing corresponding to the given authority. For example, a user having a role of manager can give the authority "capable of outputting documents with medium confidentiality level" to the MFP 110. In the present exemplary embodiment, the authority that can be given to the MFP 110 is described using an example where the type (level) of documents that can be output is specified as the authority to output documents. The content of the authority, however, may be changed based on the functions of the MFP 110. Since the present exemplary embodiment is described using the MFP 110 as an example, the authority that can be given to the MFP 110 is described as the output authority. The content of the authority, however, may be changed based on the functions of a target device.

As illustrated in FIG. 1, the present exemplary embodiment is described using a case where there is one MFP 110. Thus, the configuration in which the target to which the authority is given is limited to one MFP 110 is described for convenience of description. However, the target to which "the authority of MFP" in the column 602 is given is many unspecified MFPs 110. Thus, for example, in a case where the user owns a plurality of the MFPs 110 or in a case where the user changes the MFP 110 to a new model, the plurality of MFPs 110 or the new MFP 110 is the target to which the authority is given.

A column 603 indicates validity periods. The validity period of the output authority to be given to the image forming apparatus 110 can be set in the column 603. For example, the column 603 indicates that the MFP 110 is capable of outputting documents with the "medium" confidentiality level for a month after a manager user (having a role of manager) gives the authority to the MFP 110. For example, the confidentiality level of documents may be represented using metadata in a general cloud storage service, or directly embedded as additional information in the documents. The above-described information is authority information managed by the authority management table 600.

FIG. 5 is a flowchart illustrating processing for registering the image forming apparatus 110 in the MFP cooperation service 120. The image forming apparatus 110 is registered in the MFP cooperation service 120, whereby the image forming apparatus 110 is capable of printing a document managed by the MFP cooperation service 120 or a document managed by an external storage service that cooperates with the MFP cooperation service 120. Normally, the image forming apparatus 110 in an office is registered by the administrator user. On the other hand, in the case of telework, each user using an image forming apparatus at home registers the image forming apparatus. Thus, in a case where any user other than the administrator user makes a registration request, it is determined that the image forming apparatus 110 to be registered is an image forming apparatus at home.

FIG. 5 illustrates a sequence of registering the MFP 110 based on a device flow (RFC 8628) of OAuth 2.0 as a standard method. This is, however, merely an example, and the device registration method is not limited thereto.

In step S501, the user gives an instruction to register the MFP 110 in the MFP cooperation service 120. The user gives the registration instruction through a UI screen on the MFP 110.

In step S502, the MFP 110 requests the MFP cooperation service 120 to register the MFP 110. The cooperation service request unit 423 of the MFP 110 transmits a registration request to the MFP cooperation service 120. FIG. 11 illustrates an example of a Hypertext Transfer Protocol Secure (HTTPS) request 1101 as the registration request. As an essential parameter of the request, "client_id" is specified. The parameter "client_id" is a character string uniquely identifying the MFP 110. As an optional parameter, "scope" is specified. The parameter "scope" indicates the scope of the access token to be finally acquired.

In step S503, the MFP cooperation service 120 returns a registration URL and a UserCode to the MFP 110. If the MFP 110 includes a built-in browser, the MFP 110 displays a user authentication screen on the screen based on the received URL and UserCode. If the MFP 110 does not include a built-in browser, the MFP 110 displays a Quick Response (QR) Code® on the screen, the QR Code® is read using a mobile terminal of the user, and the user is authenticated on the mobile terminal.

In step S504, the user inputs authentication information (a user ID or a password). FIG. 9 illustrates an example of a user authentication screen 901. If the MFP 110 includes a built-in browser, the MFP 110 may directly display the user authentication screen 901 on a UI of the MFP 110. If the MFP 110 does not include a screen such as a browser, the method of displaying a QR Code® on the screen of the MFP 110, reading the QR Code® using the mobile terminal, and displaying the user authentication screen 901 on a browser of the mobile terminal as described above with reference to step S503 may be used. The user inputs the authentication information on the user authentication screen 901 to perform user authentication.

In step S505, the MFP cooperation service 120 authenticates the user. Based on the authentication information input in step S504, the MFP cooperation service 120 authenticates the user requesting the registration of the MFP 110.

In step S506, the role of the authenticated user is identified. FIG. 10 illustrates an example of a user table 1000. As illustrated in the user table 1000, a role, a department name, and a user name are managed for each user. If the role of the authenticated user is an administrator, this means that the user has administrator authority, and it is determined that the processing for registering the MFP 110 for office use is performed. Although depending on the operation of the office, the output authority of the MFP 110 for office use is not particularly limited in the present exemplary embodiment.

If the user is an administrator (YES in step S506), the processing proceeds to step S507. If the user is not an administrator (NO in step S506), the processing proceeds to step S508. Although the user table 1000 specifies the roles, the departments, and the user names as user attributes, the user attributes are not limited thereto.

In step S507, the MFP cooperation service 120 determines to give the authority to output any document, and then the processing proceeds to step S509. As described above, the administrator user has the authority to register the MFP 110 for office use, and the output authority is not particularly limited. Thus, the MFP cooperation service 120 gives the authority to output any document. In this case, the administrator user is capable of outputting any document also using a printer at home, but this is not an issue because the administrator user has the authority to freely edit the output authority in the first place.

In step S508, the MFP cooperation service 120 refers to the authority management table 600 and determines the output authority to be given to the MFP 110. If the user is not an administrator user, it is determined that a general user attempts to register the user's MFP at home. Thus, it is desirable to limit the output authority to be given to the MFP 110. In this case, the MFP cooperation service 120 refers to the user table 1000 and the authority management table 600, and gives the output authority based on the attribute of the user. For example, if the user requesting the registration has the user name "PQRS" in the user table 1000, the role is "user" and the department is "legal". Further, referring to the authority management table 600, if the role is "user", the authority of MFP is "capable of outputting documents with low confidentiality level". If the department is "legal", the authority of MFP is "capable of outputting documents in path://root/legal/**/*.*". Thus, the output authority that can be given to the MFP 110 by this user includes the authority "capable of outputting documents with low confidentiality level" and the authority "capable of outputting documents in path://root/legal/**/*.*".

In step S509, the MFP cooperation service 120 requests the user to give the authority to the MFP 110. The MFP cooperation service 120 displays an approval screen for obtaining the user's permission to give the authority determined in step S507 or S508 to the MFP 110. FIG. 9 illustrates an example of an approval screen 902 where the MFP cooperation service 120 obtains approval from the user to give the authority. As illustrated in the approval screen 902, the MFP cooperation service 120 displays a list of authorities to be given to the MFP 110, and an "approve" button.

If the user approves the giving of the authority, the user presses the "approve" button. As described with reference to step S504, the approval screen 902 can be directly displayed on the MFP 110 or displayed on the mobile terminal. The approval screen 902 may display information (e.g., a device name, a device ID) for identifying the MFP 110. Alternatively, a configuration may be employed in which the authority to be approved can be selected from the displayed list of authorities. If approval is obtained from the user, the access token corresponding to the approved authority is issued, and is managed using an access token table 1200.

In step S510, the MFP cooperation service 120 determines whether the giving of the authority is approved. If the user approves the giving of the authority in step S509 (YES in step S510), the processing proceeds to step S511. If the user does not approve the giving of the authority in step S509 (NO in step S510), the giving of the authority is not possible, and thus the registration processing is canceled, and the processing in the flowchart ends.

In step S511, the MFP 110 transmits an access token request to the MFP cooperation service 120. Since the authority corresponding to the user requesting the registration is determined in step S507 or S508, the MFP 110 requests the access token corresponding to the determined authority.

In step S512, the MFP cooperation service 120 transmits the access token to the MFP 110. Since the authority corresponding to the user requesting the registration is determined in step S507 or S508, the MFP cooperation service 120 transmits the access token corresponding to the determined authority. The format of the access token is not particularly limited. For example, in the case of a JSON (JavaScript Object Notation) Web Token (JWT) format, information regarding the scope and the expiration date is included in the access token. If the information is not included in the access token, the authority or expiration date of the access token may be managed separately using a table as illustrated in the access token table 1200 in FIG. 12.

Through the above-described processing, it is possible to give the MFP 110 the access token having the output authority based on the attribute of the user requesting the registration.

In a case where a single user registers two or more MFPs 110, steps S501 to S510 are repeated as many times as the number of MFPs 110 to be registered.

FIG. 7 is a flowchart illustrating processing performed by the image forming apparatus 110 to print a document.

In step S701, the user logs into the MFP cooperation service 120 via the MFP 110. A user name, a password, and a Personal Identification Number (PIN) code are assumed to be input as authentication information in step S701, but the authentication information is not limited thereto.

In step S702, the MFP 110 transmits a request for a list of jobs of the logged-in user to the MFP cooperation service 120. This request includes the access token acquired when the MFP 110 is registered.

In step S703, the MFP cooperation service 120 determines whether there is a job for which the output authority has not yet been checked. If there is a job for which the output authority has not yet been checked (YES in step S703), the processing proceeds to step S704. If there is no job for which the output authority has not yet been checked (NO in step S703), the processing proceeds to step S707.

In step S704, the MFP cooperation service 120 verifies the access token to check the authority to output the job.

In step S705, as a result of the verification of the access token, the authority control unit 433 determines whether the access token has the output authority. If the access token has the output authority (YES in step S705), the processing proceeds to step S706. If the access token does not have the output authority (NO in step S705), the processing returns to step S703. In step S703, the MFP cooperation service 120 determines whether there is a job for which the output authority has not yet been checked.

In step S706, the MFP cooperation service 120 adds the job to a job list to be returned to the MFP 110. As a result of the verification of the access token, if the access token has the authority to output the target job, the MFP cooperation service 120 adds the target job to the job list to be returned to the MFP 110. More specifically, based on the access token included in the request in step S702 and the access token table 1200 in FIG. 12, the MFP cooperation service 120 checks the authority given to the MFP 110. For example, in the case of an access token "abc123", the MFP 110 is capable of outputting documents with the "medium" confidentiality level. Then, the MFP cooperation service 120 identifies a job with the "medium" confidentiality level among jobs associated with the user information.

At this time, the MFP cooperation service 120 checks the expiration date of the access token. If the access token is expired, the MFP cooperation service 120 returns an error in response to the job list request.

If additional information regarding the document for determining the output authority is unable to be acquired, the MFP cooperation service 120 treats the access token as not having the output authority. For example, if the confidentiality level that is supposed to be registered in metadata of the document is not registered therein, the authority regarding the confidentiality level is unable to be checked, and thus the MFP cooperation service 120 considers that the access token does not have the authority to output the job.

In step S707, the MFP cooperation service 120 returns the job list to the MFP 110. Since the jobs that can be output are added to the job list in the steps up to step S706, the MFP cooperation service 120 returns the job list to the MFP 110.

In step S708, the MFP 110 displays the job list. Since the job list containing the jobs that can be output is returned in step S707, the MFP 110 displays the job list on the screen, whereby the user can select a job, which can be output, from the job list and print the selected job using the MFP 110.

Through the above-described processing, in a case where the MFP 110 is registered in the MFP cooperation service 120, it is possible to give the MFP 110 the authority to output documents, based on the attribute of the user requesting the registration, and limit the printing by the MFP 110.

In a second exemplary embodiment, a case will be described where the MFP 110 is enabled to temporarily print a document for which the MFP 110 does not have the output authority.

In the first exemplary embodiment, depending on the user requesting the registration of the MFP 110, the output authority is given to the MFP 110. However, there is a case where the user wishes to temporarily print a document outside the authority using a printer at home. Thus, in the present exemplary embodiment, a case where printing is enabled also in such a case will be described.

Figure 8:
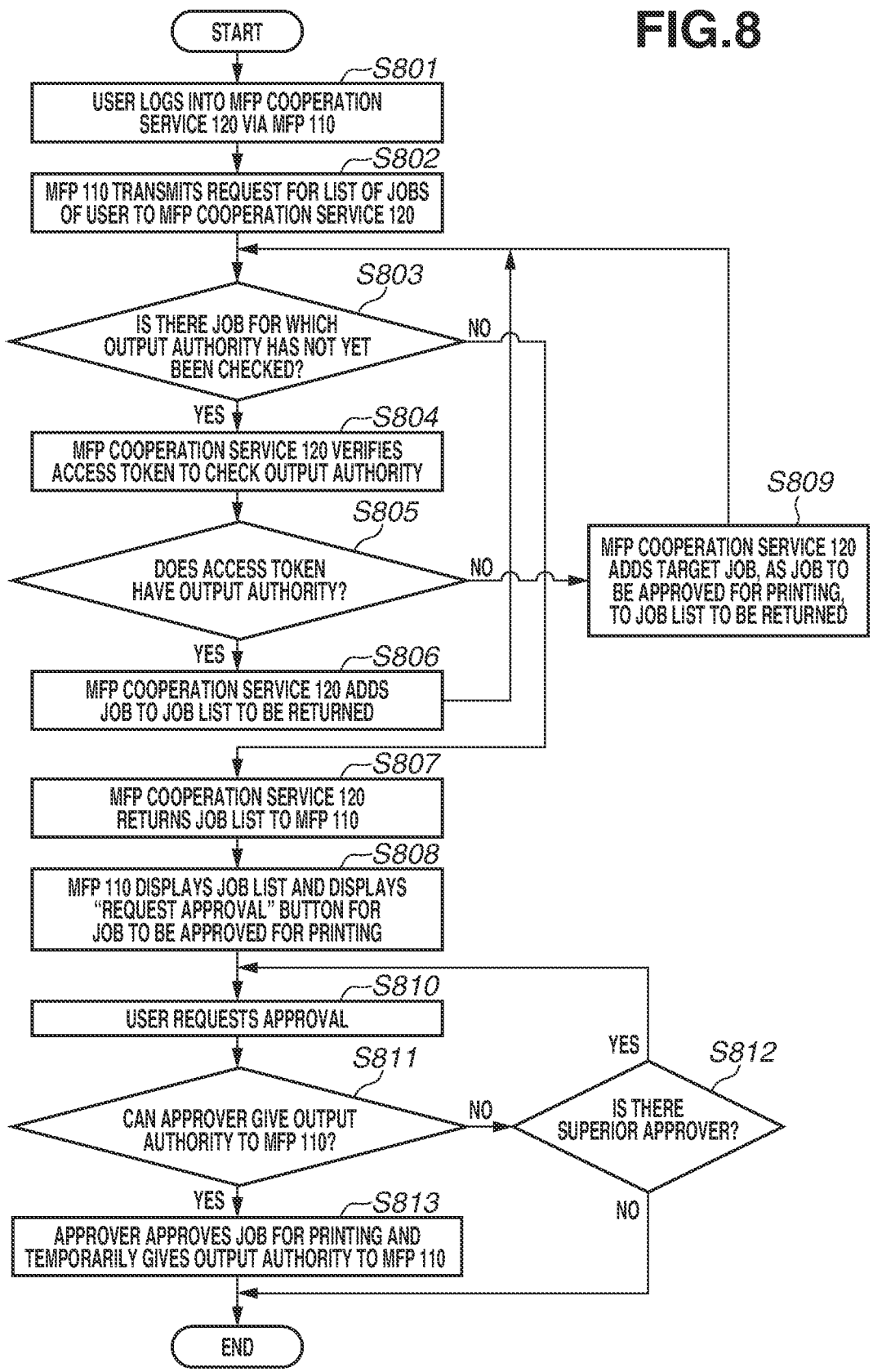
FIG. 8 is a flowchart illustrating processing for obtaining approval from an approver to print a document outside the output authority at the time of printing.

FIG. 8 is a flowchart illustrating processing for enabling the MFP 110 to temporarily print a document outside the authority.

Steps S801 to S807 are similar to steps S701 to S707 in FIG. 7, respectively and thus descriptions thereof will be omitted.

In step S808, the MFP 110 displays the job list. Because a document for which the MFP 110 does not have the output authority is included in the job list, the MFP 110 displays, in step S809 (described below), an approval request button for the document for which the MFP 110 does not have the authority. FIG. 13 illustrates an example of a job list 1300 displayed on the MFP 110. The job list 1300 displays job names and print settings such as "Black and White" and "Two-Sided/One-Sided". For a job for which the MFP 110 does not have the output authority, a "Request Approval" button 1301 is displayed.

In step S809, the MFP cooperation service 120 adds the target job, as a job to be approved for printing, to a job list to be returned to the MFP 110. In FIG. 7, a job for which the MFP 110 does not have the authority is not added to the job list. In the present exemplary embodiment, a document for which the MFP 110 does not have the authority is also added to the job list. At this time, the MFP cooperation service 120 adds the target job as a job to be approved for printing and then obtains approval at the time of printing.

In step S810, the user requests approval to print the job. The MFP 110 displays the "Request Approval" button 1301 for the job to be approved for printing, in the steps up to step S809. When the user presses the "Request Approval" button 1301, a request for approval to print the job is transmitted from the MFP 110 to the MFP cooperation service 120.

In step S811, the MFP cooperation service 120 determines whether an approver can give the output authority to the MFP 110. The MFP cooperation service 120 refers to the authority management table 600 to check the output authority that can be given to the MFP 110, based on the attribute of the approver. As a result, if the approver can give the output authority to the MFP 110 (YES in step S811), the processing proceeds to step S813. If the approver is unable to give the output authority to the MFP 110 (NO in step S811), the processing proceeds to step S812.

In step S812, the MFP cooperation service 120 determines whether there is a superior approver. For example, if a section manager is the approver and is unable to give the authority in step S811, then in step S812, the MFP cooperation service 120 determines whether there is a department manager, who is the section manager's superior, as an approver. If there is a superior approver (YES in step S812), the processing returns to step S810. If there is no superior approver (NO in step S812), the MFP cooperation service 120 determines that the approval is not possible, and the processing in the flowchart ends.

In step S813, the approver approves the job for printing and temporarily gives the output authority to the MFP 110. If the approver is determined to be able to give the output authority to the MFP 110 in the steps up to step S812, then in this step, the approver approves the job for printing, thereby making it possible to temporarily give the output authority to the MFP 110.

Through the above-described processing, in a case where the user wishes to print a document for which the MFP 110 does not have the output authority, the user obtains approval to print the document from an approver, whereby it is possible to temporarily give the output authority to the MFP 110 and enable the MFP 110 to print the document.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-001442, filed Jan. 7, 2022, which is hereby incorporated by reference herein in its entirety.

What is claimed is:

1. An information processing apparatus configured to provide a service, the information processing apparatus comprising:
a memory; and
a processor,
wherein in a case where the information processing apparatus receives a registration request for registering an image forming apparatus in the service, the processor is configured to:
identify an output authority of an instructing user based on a role of the instructing user and a table for managing a role and the output authority of the instructing user in association with each other, wherein the instructing user is a user requesting registration;
issue an access token based on the identified output authority of the instructing user who has given an instruction to transmit the registration request; and
transmit the issued access token to the image forming apparatus,
wherein the image forming apparatus determines whether a document to be outputted is limited based on the issued access token.

2. The information processing apparatus according to claim 1, further comprising a table for managing a role and/or a department and an output authority of a user in association with each other,
wherein in a case where the information processing apparatus receives the registration request for registering the image forming apparatus in the service, the processor identifies the output authority of the instructing user based on a role of the instructing user and/or a department to which the instructing user belongs and the table, and issues the access token based on the identified output authority.

3. The information processing apparatus according to claim 1, further comprising a table for managing identification information uniquely identifying a user and an output authority of the user in association with each other,
wherein in a case where the information processing apparatus receives the registration request for registering the image forming apparatus in the service, the processor identifies the output authority of the instructing user based on identification information uniquely identifying the instructing user and the table, and issues the access token based on the identified output authority.

4. The information processing apparatus according to claim 1,
wherein the image forming apparatus holds the access token given by the information processing apparatus,
wherein in a case where the instructing user logs into the image forming apparatus, the image forming apparatus transmits a job list request to the information processing apparatus, together with the held access token, and
wherein, based on the access token included in the job list request, the information processing apparatus transmits a list of jobs that satisfy the output authority corresponding to the access token to the image forming apparatus.

5. The information processing apparatus according to claim 1, wherein an expiration date based on the instructing user is set for the issued access token.

6. The information processing apparatus according to claim 1,
wherein the registration request is transmitted from the image forming apparatus to the information processing apparatus,
wherein the information processing apparatus transmits, to the image forming apparatus, information regarding a screen for prompting the instructing user to input information for authenticating the instructing user, and
wherein the information processing apparatus issues the access token based on the output authority of the instructing user authenticated based on the information input through the screen.

7. The information processing apparatus according to claim 1, wherein the access token is issued in a case where approval to give the output authority to the image forming apparatus is obtained from the instructing user.

8. The information processing apparatus according to claim 1, wherein the output authority includes information regarding a confidentiality level of a document that the image forming apparatus is capable of printing.

9. The information processing apparatus according to claim 1,
wherein the image forming apparatus holds the access token given by the information processing apparatus,
wherein in a case where the instructing user logs into the image forming apparatus, the image forming apparatus transmits a job list request to the information processing apparatus, together with the held access token,
wherein, based on the access token included in the job list request, the information processing apparatus transmits, to the image forming apparatus, a list including a job that satisfies the output authority corresponding to the access token and a job that does not satisfy the output authority corresponding to the access token, and
wherein, in the list, the job that does not satisfy the output authority corresponding to the access token is displayed so as to be identified as a job to be approved for printing by an approver.

10. A control method for an information processing apparatus configured to provide a service, the control method comprising:
in a case where the information processing apparatus receives a registration request for registering an image forming apparatus in the service,
identifying an output authority of an instructing user based on a role of the instructing user and a table for managing a role and the output authority of the instructing user in association with each other, wherein the instructing user is a user requesting registration;
issuing an access token based on the identified output authority of the instructing user who has given an instruction to transmit the registration request; and
transmitting the issued access token to the image forming apparatus,
wherein the image forming apparatus determines whether a document to be outputted is limited based on the issued access token.

11. A non-transitory computer-readable storage medium that stores a program, wherein the program causes a processor to execute a control method for an information processing apparatus configured to provide a service, the control method comprising:
in a case where the information processing apparatus receives a registration request for registering an image forming apparatus in the service, identifying an output authority of an instructing user based on a role of the instructing user and a table for managing a role and the output authority of the instructing user in association with each other, wherein the instructing user is a user requesting registration;

issuing an access token based on the identified output authority of the instructing user who has given an instruction to transmit the registration request; and transmitting the issued access token to the image forming apparatus, wherein the image forming apparatus determines whether a document to be outputted is limited based on the issued access token.

\* \* \* \* \*